United States Patent
Saijo et al.

(10) Patent No.: US 11,934,623 B2
(45) Date of Patent: Mar. 19, 2024

(54) INFORMATION PRESENTATION APPARATUS, METHOD, AND PROGRAM

(71) Applicant: NIPPON TELEGRAPH AND TELEPHONE CORPORATION, Tokyo (JP)

(72) Inventors: Ryohei Saijo, Musashino (JP);
Shinichiro Eitoku, Musashino (JP);
Masahiro Watanabe, Musashino (JP);
Tae Sato, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/908,496

(22) PCT Filed: Mar. 3, 2020

(86) PCT No.: PCT/JP2020/008902
§ 371 (c)(1),
(2) Date: Aug. 31, 2022

(87) PCT Pub. No.: WO2021/176555
PCT Pub. Date: Sep. 10, 2021

(65) Prior Publication Data
US 2023/0121643 A1 Apr. 20, 2023

(51) Int. Cl.
*G06F 3/0481* (2022.01)
*G06F 3/01* (2006.01)
(52) U.S. Cl.
CPC ........... *G06F 3/0481* (2013.01); *G06F 3/013* (2013.01)
(58) Field of Classification Search
CPC ........... G06F 3/0481; G06F 3/013; G06F 3/01
(Continued)

(56) References Cited

U.S. PATENT DOCUMENTS

2018/0314889 A1 11/2018 Fukazawa et al.
2019/0066630 A1* 2/2019 Fukazawa ............... G09G 5/36
(Continued)

FOREIGN PATENT DOCUMENTS

WO WO-2017104198 A1 6/2017
WO WO-2017138212 A1 8/2017

OTHER PUBLICATIONS

Yoshio Ishiguro and Jun Rekimoto, Peripheral Vision Annotation: Noninterference Information Presentation Method by Using Gaze Information, Information Processing Society of Japan Journal, vol. 53, No. 4, 2012, pp. 1328-1337.
(Continued)

*Primary Examiner* — Stephen S Hong
*Assistant Examiner* — Broderick C Anderson
(74) *Attorney, Agent, or Firm* — Harness, Dickey & Pierce, P.L.C.

(57) ABSTRACT

According to one aspect of the present invention, an information presentation apparatus for displaying information on a display device including a display area corresponding to a visual field range of a user includes: a first storage medium that stores presentation information including content information representing a presentation content and attribute information of the content information; a detection unit that detects a gaze point within the visual field range of the user; and a presentation control unit that determines a presentation position of the content information within the visual field range of the user in accordance with the attribute information stored together with the content information to be presented and the detected gaze point and cause the content information to be displayed at a position corresponding to the determined presentation position within the display area of the display device.

6 Claims, 12 Drawing Sheets

(58) Field of Classification Search
USPC .......................................................... 715/771
See application file for complete search history.

(56) References Cited

U.S. PATENT DOCUMENTS

2019/0104097 A1* 4/2019 Lalka ................. G06Q 30/0261
2019/0235936 A1* 8/2019 Murdock ................ G06F 9/542

OTHER PUBLICATIONS

Rui Yoshida et al., Input urging system using unpleasant notification based on negative motivation, Second International Conference on Electrical, Computer and Communication Technologies (ICECCT), Feb. 22, 2017.

Reynold Bailey et al., Subtle gaze direction, ACM Trans. Graph, vol. 28, No. 4, 2009, pp. 1-14.

* cited by examiner

Fig. 4

| PRESENTATION INFORMATION ID | PRESENTATION INFORMATION | URGENCY DEGREE | PRESENTATION FREQUENCY (NUMBER OF TIMES/DAY) |
|---|---|---|---|
| 1 | TAKE STAIRS | 1 | 5 |
| 2 | TAKE MEDICINE FOR HYPERTENSION | 10 | 3 |

| BROWSING RECORD ID | PRESENTATION INFORMATION ID | BROWSING RECORD | PERIOD OF TIME ELAPSED UNTIL BROWSING (SECOND) | PERIOD OF TIME ELAPSED DURING BROWSING (SECOND) | PRESENTATION POSITION (DEGREE) |
|---|---|---|---|---|---|
| 1 | 1 | −1 | −1 | 0 | 80 |
| 2 | 2 | 1 | 2 | 30 | 20 |
| 3 | 1 | 1 | 3600 | 50 | 70 |

INFORMATION PRESENTATION APPARATUS, METHOD, AND PROGRAM

CROSS-REFERENCE TO RELATED APPLICATIONS

This application is a 371 U.S. National Phase of International Application No. PCT/JP2020/008902, filed on Mar. 3, 2020. The entire disclosure of the above application is incorporated herein by reference.

TECHNICAL FIELD

An aspect of the present invention relates to information presentation apparatuses, methods, and programs for presenting information, for example, in a visual field of a user in activity.

BACKGROUND ART

In recent years, there has been proposed a system of interrupting a user's daily activities to present information to the user, with the use of, for example, an advertisement display installed at a street corner or smart glasses worn by the user. A challenge for this type of system is how to make the user recognize information with certainty without adversely affecting the user's daily activities.

For example, NPL 1 describes a technique for presenting overview information in a peripheral visual field of a user prior to information presentation so as to enable the information presentation while suppressing an adverse effect on the user's activities.

In addition, NPL 2 describes a technique for changing a presentation method in a certain order based on an elapsed time from when information is initially presented so as to have the user browse information that has been presented in the past but has not yet been browsed by the user.

Furthermore, NPL 3 describes a technique for presenting a change in brightness at a position on a display corresponding to a peripheral visual field area of a user and guiding the user's gaze point to such a position, by utilizing a human characteristic of sensitively responding to a change in brightness in a peripheral visual field.

CITATION LIST

Non Patent Literature

NPL 1: Yoshio Ishiguro, Jun Rekimoto, "Peripheral Vision Annotation: Noninterference Information Presentation Method by Using Gaze Information", Journal of Information Processing Society, Vol. 53, No. 4, pp. 1328-1337, 2012.

NPL 2: R. Yoshida, K. Takahashi, T. Kawamura, & K. Sugahara, "Input urging system using unpleasant notification based on negative motivation", Second International Conference on Electrical, Computer and Communication Technologies (ICECCT), 1-5, 2017.

NPL 3: Reynold Bailey, et al. "Subtle gaze direction." ACM Trans. Graph. Vol. 28, No. 4, Article 100, 14 pages, 2009.

SUMMARY OF THE INVENTION

Technical Problem

In the technique described in NPL 1, however, the presentation position of the information is always fixed at a specific position within the visual field centering around the user's gaze point. For this reason, information is always presented in the vicinity of the gaze point regardless of its characteristic such as an urgency degree, a presentation history, or a browsing history. Thus, some users feel annoyed and uncomfortable.

On the other hand, in the technique described in NPL 2, the information presentation method is changed in accordance with a period of time elapsed until the user browses, and thus reduces the user's uncomfortable feeling. However, information that has not been presented in the past is presented in a hardly noticeable manner for the user. This unfortunately makes it difficult for the user to recognize highly urgent information.

In addition, in the technique described in NPL 3, a bright spot is displayed in the peripheral visual field of the user in the information presentation, so that the user's attention can be attracted. However, the user does not always visually recognize the information displayed in the peripheral visual field area, which means that the user does not always recognize highly urgent information with certainty.

The present invention has been made in view of the above circumstances, and, in one aspect, intends to provide a technique capable of presenting information at an appropriate position within a visual field range of a user in accordance with an attribute or a browsing situation of the information.

Means for Solving the Problem

In order to solve the above problem, a first aspect of the present invention is an information presentation apparatus for displaying information on a display device including a display area corresponding to a visual field range of a user, the information presentation apparatus including: a first storage medium that stores presentation information including content information representing a presentation content and attribute information of the content information; a detection unit that detects a gaze point within the visual field range of the user; and a presentation control unit that determines a presentation position of the content information within the visual field range of the user in accordance with the attribute information stored together with the content information to be presented and the detected gaze point and cause the content information to be displayed at a position corresponding to the determined presentation position within the display area of the display device.

In order to solve the above-described problem, a second aspect of the present invention is an information presentation apparatus for displaying information on a display device including a display area corresponding to a visual field range of a user, the information presentation apparatus including: a first storage medium that stores presentation information including content information representing a presentation content; a second storage medium that stores information representing a browsing history of the user regarding presentation of the content information; a detection unit that detects a gaze point within the visual field range of the user; and a presentation control unit that calculates information related to a browsing rate of the user at a past presentation position within the visual field range of the user in accordance with the stored information representing the browsing history, determines a presentation position of the content information within the visual field range of the user in accordance with the information related to the browsing rate and the detected gaze point, and causes the content information to be displayed at a position corresponding to the determined presentation position within the display area of the display device.

Effects of the Invention

According to a first aspect of the present invention, it is possible to provide a technique capable of presenting information at an appropriate position within a visual field range of a user in accordance with attribute information of the information.

According to a second aspect of the present invention, it is possible to provide a technique capable of presenting information at an appropriate position within a visual field range of a user in accordance with information representing a past browsing history.

BRIEF DESCRIPTION OF DRAWINGS

FIG. 4 is a diagram illustrating an example of a configuration of presentation information stored in a presentation information database of the information processing apparatus illustrated in FIG. 3.

FIG. 5 is a diagram illustrating an example of a configuration of browsing history information stored in a browsing record database of the information processing apparatus illustrated in FIG. 3.

DESCRIPTION OF EMBODIMENTS

Hereinafter, an embodiment of the present disclosure will be described with reference to the drawings.

Embodiment

Configuration Example (1) System

Figure 1:
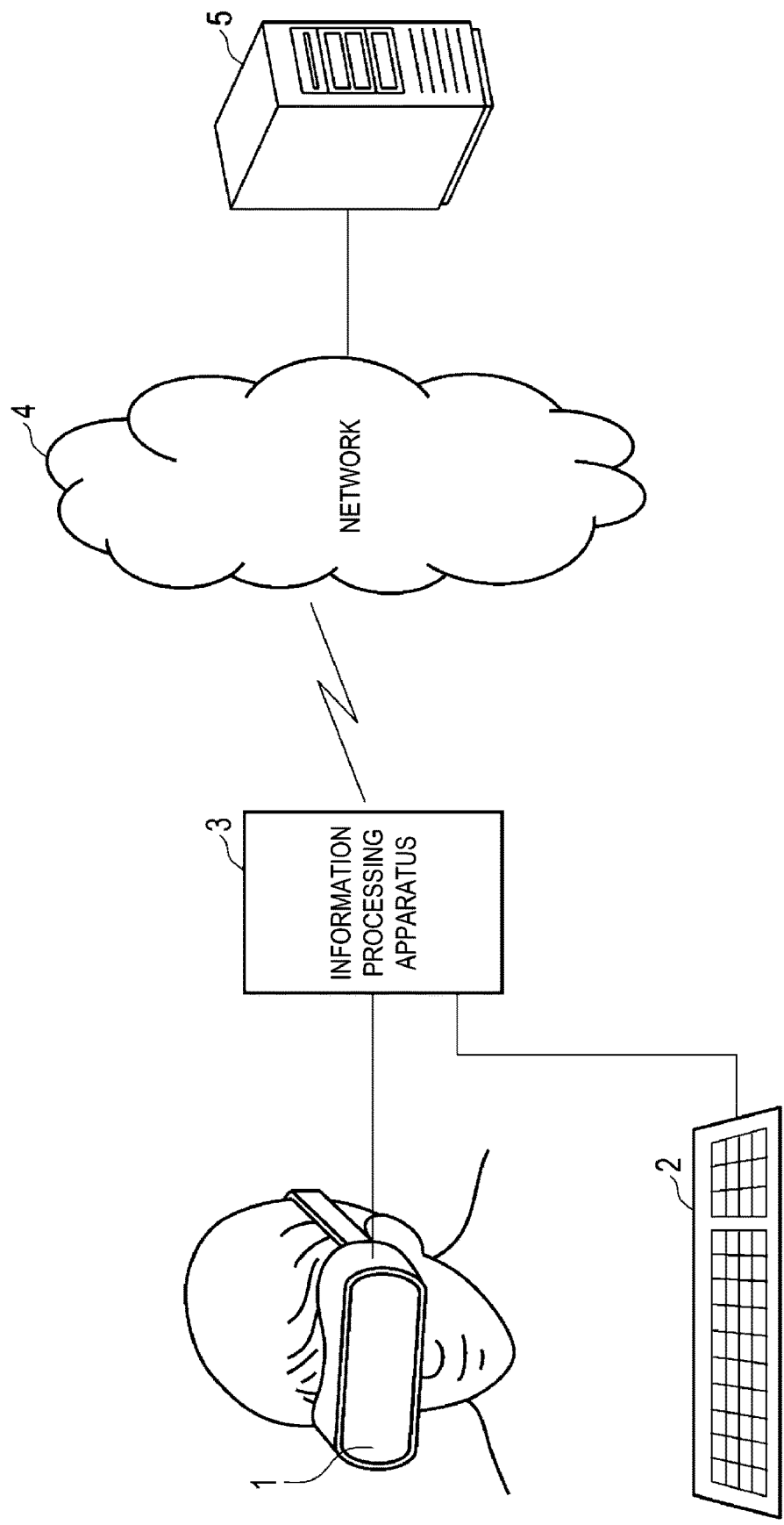
FIG. 1 is a diagram illustrating an overall configuration of a system including an information presentation apparatus according to an embodiment of the present invention.

FIG. 1 is a diagram illustrating an overall configuration of a system including an information presentation apparatus according to an embodiment of the present invention.

The system in the embodiment includes a display device 1, an input device 2, and an information processing apparatus 3 that functions as the information presentation apparatus. The information processing apparatus 3 is configured such that information can be transmitted between the information processing apparatus 3 and a server apparatus 5 through a network 4.

The display device 1 includes, for example, a head-mounted display of goggle type, or smart glasses of eyeglass type, and is detachably mounted on a user's head. The display device 1 is provided with a display panel including, for example, an organic electro luminescence (EL) display, and includes a display area corresponding to a visual field range of the user.

In addition, the display device 1 is provided with a camera 6 for imaging, for example, the user's eyeballs. Image data of the eyeballs that has been captured by the camera 6 is used for detecting the user's visual line.

The input device 2 including, for example, a keyboard or a touch panel, and is used for the user to input operation information. The operation information that has been input on the input device 2 is input to the information processing apparatus 3. Note that the input device 2 may be a pen input type device or a stick-shaped device, and moreover may be a device for detecting input voices of the user by utilizing voice recognition technology, or a device for detecting a gesture expressed through a movement of the user's body, such as a hand, an arm, a neck, a blink, and the like.

The server apparatus 5 is provided with, for example, a function of transmitting, to the information processing apparatus 3, information to be presented to the user. As an example of use applications, the server apparatus 5 includes a server computer or a personal computer operated by a medical institution, a pharmacy, a healthcare center, or the like, and transmits information related to treatment or health maintenance to users. Note that the operator of the server apparatus 5 and the type or content of the information to be presented are not limited to the above.

The network 4 includes, for example, a public IP network such as the Internet and an access network for accessing the public IP network. A local area network (LAN), a wireless LAN, a public wired network, a public mobile communications network, or a cable television (CATV) network is used for the access network.

(2) Information Processing Apparatus 3

Figure 2:
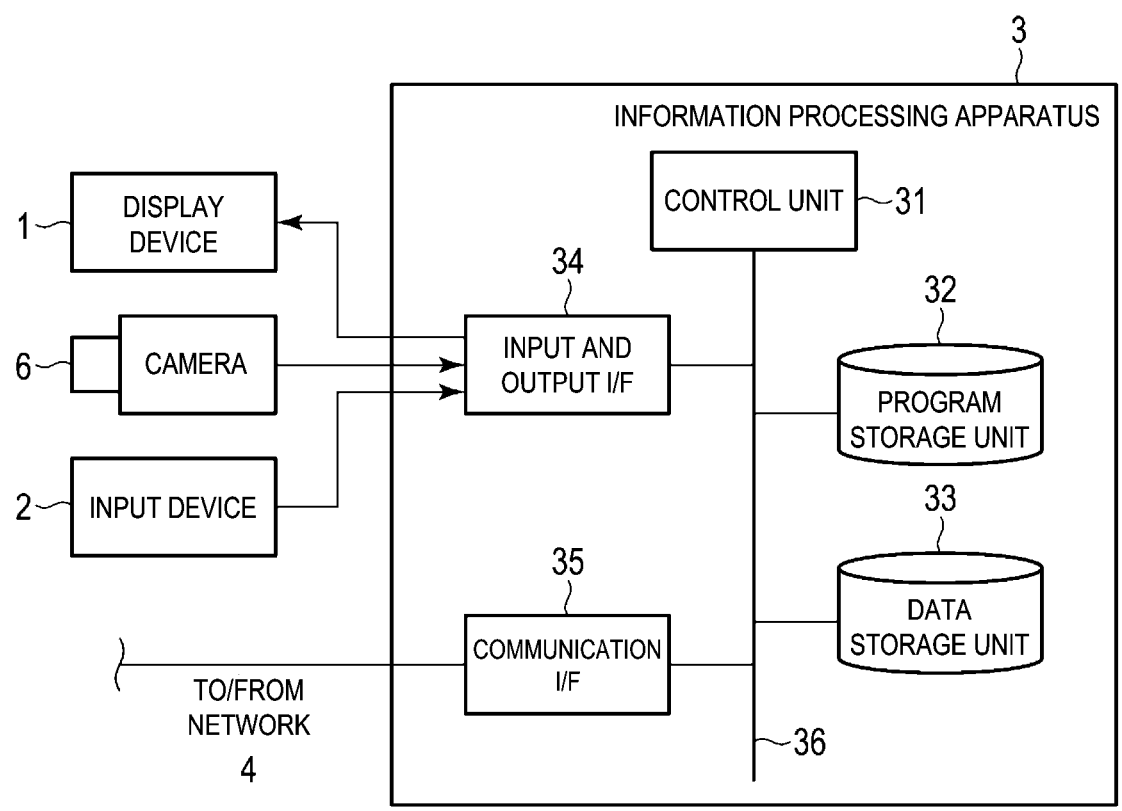
FIG. 2 is a block diagram illustrating a hardware configuration of an information processing apparatus that functions as the information presentation apparatus according to the embodiment of the present invention.
Figure 3:
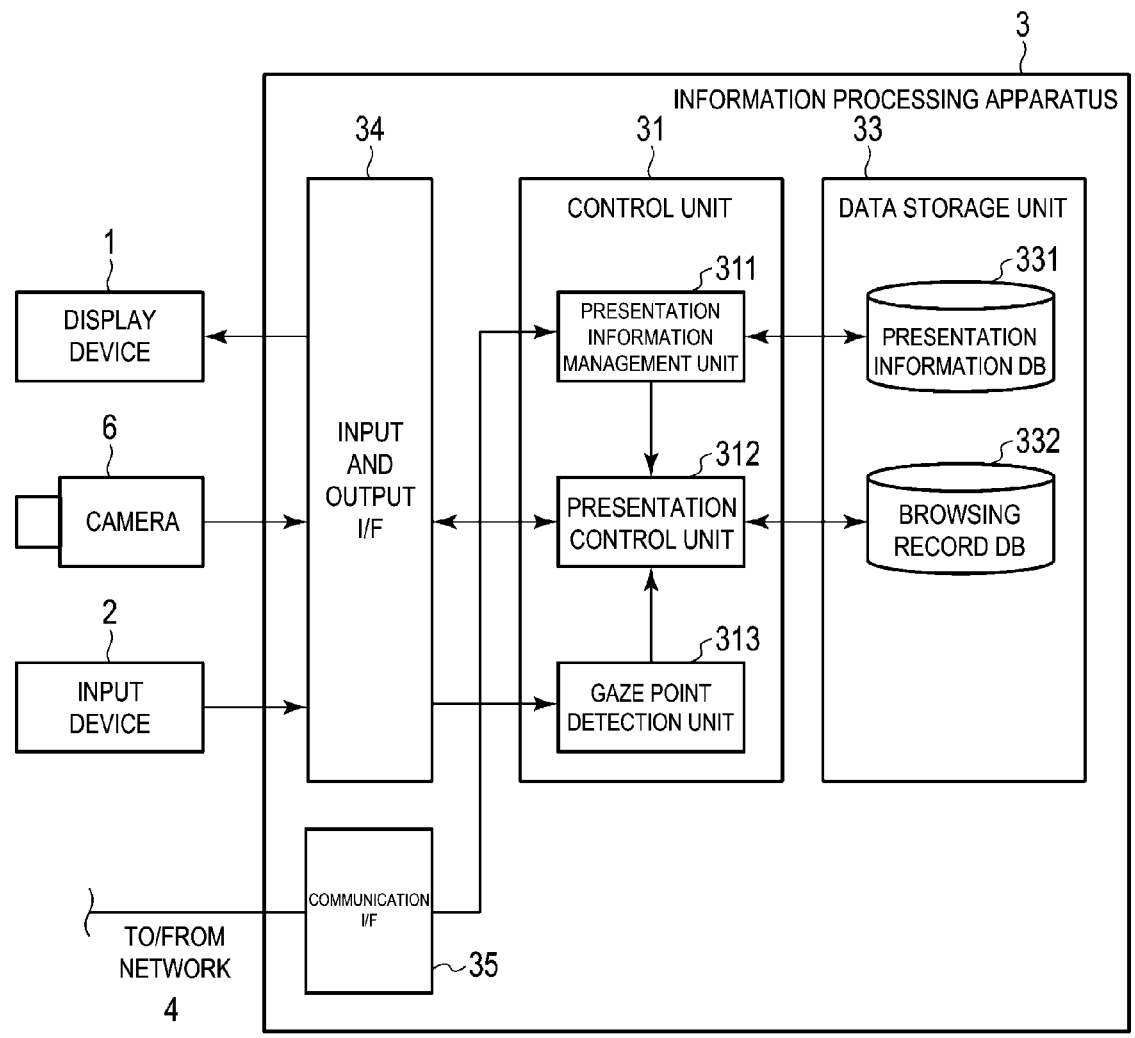
FIG. 3 is a block diagram illustrating a software configuration of the information processing apparatus that functions as the information presentation apparatus according to the embodiment of the present invention.

FIGS. 2 and 3 are block diagrams respectively illustrating a hardware configuration and a software configuration of the information processing apparatus that functions as the information presentation apparatus according to the embodiment of the present invention.

The information processing apparatus 3 includes a mobile information terminal such as a smart phone or a wearable terminal. Note that the information processing apparatus 3 may be integrally accommodated in the head-mounted display.

The information processing apparatus 3 includes a control unit 31 including a hardware processor such as a central processing unit (CPU). A program storage unit 32, a data storage unit 33, an input and output interface (input and output I/F) 34, and a communication interface (communication I/F) 35 are connected to the control unit 31 through a bus 36.

The display device 1, the input device 2, and the camera 6 are connected to the input and output I/F 34. The input and output I/F 34 causes the display device 1 to display the display data of presentation information that is output from the control unit 31, and also inputs image data output from the camera 6 and operation information output from the input device 2 to the control unit 31.

The communication I/F 35 receives presentation information transmitted from the server apparatus 5 through the network 4 under control of the control unit 31, and an interface for a wireless communication network such as a wireless local area network (LAN) or Bluetooth (trade name) is used. Note that in a case where it is not necessary to receive the presentation information from the server apparatus 5, the communication I/F35 is not necessary.

As to the program storage unit 32, for example, a non-volatile memory that is writable and readable at any time such as a hard disk drive (HDD) or a solid state drive (SSD) is used as a main storage medium. In its storage area, in addition to middleware such as an operation system (OS), a program for performing various processing operations according to the embodiment of the present invention is stored. Note that, as the storage medium, the HDD or the SSD described above may be combined with a read only memory (ROM).

The data storage unit 33 is configured by combining, for example, an HDD or an SSD with a random access memory (RAM). In its storage area, a presentation information database (presentation information DB) 331 and a browsing record database (browsing record DB) 332 used in the embodiment of the present invention are stored.

The presentation information DB 331 is used to store, for example, the presentation information that has been transmitted from the server apparatus 5. The presentation information includes, for example, information representing a content to be presented (e.g., text data), a value indicating an urgency degree of the content information, and a value indicating a presentation frequency of the content information. These values are stored in association with an identifier of the presentation information (presentation information ID). Note that the presentation information may be information that has been input by the user on the input device 2, or may be information that has been stored by, for example, a manufacturer, in the presentation information DB 331.

The browsing record DB 332 is used to store browsing history information representing a browsing situation of the user in relation to the information displayed on the display device 1. The browsing history information includes, for example, the presentation information ID, data indicating whether the user has performed an operation for browsing information (browsing record), data indicating a period of time that has elapsed until the user browses the information since the information presentation (a period of time elapsed until browsing (seconds)), data indicating a period of time while the user has been browsing the presented information (a period of time elapsed during browsing (seconds)), and data indicating an angle from the user's gaze point to the presentation position (presentation position (degrees)). These pieces of data each are stored in association with an identifier (browsing record ID) indicating a row where the piece of data is stored in the browsing record DB 332. Note that the above presentation position (degrees) indicates, within the visual field of the user, an angle between the user's visual line direction while the user is looking at any point (gaze point) and the user's visual line direction when it is assumed that the user looks at the position of the presented information.

The control unit 31 includes, as processing functions according to the embodiment of the present invention, a presentation information management unit 311, a presentation control unit 312, and a gaze point detection unit 313. These processing units 311 to 313 are each achieved by causing a hardware processor to execute the program stored in the program storage unit 32.

The presentation information management unit 311 monitors, for example, a presentation request for each piece of the presentation information stored in the presentation information DB 331. Then, when the presentation request is issued, the presentation information management unit 311 performs an operation of reading the corresponding presentation information from the presentation information DB 331, and notifying the presentation control unit 312.

The gaze point detection unit 313 acquires, for example, image data including the user's eyeballs that has been captured by the camera 6 via the input and output I/F 34. Then, the gaze point detection unit 313 performs an operation of detecting the user's visual line direction based on the above acquired image data, and notifying the presentation control unit 312 of a gaze point P within the visual field range of the user based on the detected user's visual line direction and preset information indicating the visual field range of the user.

The presentation control unit 312 is provided with a function of determining a presentation position of the information within the visual field range of the user and a function of determining a display position corresponding to the above determined presentation position within a display area of the display device 1. Approaches of determining the above presentation position include a plurality of approaches as follows.

(1) First Approach

An angle $\theta$ with reference to the above gaze point P is calculated in accordance with the user's current gaze point P that has been detected by the above gaze point detection unit 313, and a value indicating the urgency degree and a value indicating the presentation frequency of the content information to be presented from now that have been notified from the above presentation information management unit 311. Then, within the display area of the display device 1, the display position corresponding to the above calculated angle $\theta$ is determined. Note that the angle $\theta$ may be calculated in accordance with at least one of the value indicating the urgency degree or the value indicating the presentation frequency.

(2) Second Approach

In a case where at least one of the value indicating the urgency degree of the information to be presented from now, the value indicating the presentation frequency of the information to be presented from now, or the angle at a time when the information presentation has been conducted in the past is given, the user's browsing rate at the time when information matching in at least one of the given urgency degree, presentation frequency, or angle has been presented in the past is calculated. Then, by using the above browsing rate that has been calculated as information indicating the user's tendency at the time of information browsing, the display position of the above information within the display area of the display device 1 is determined.

(3) Third Approach

The user's browsing rate is calculated for each of all presentation positions where the information presentation has been conducted in the past, and the display position of the above information within the display area of the display device 1 is determined in accordance with the browsing rate that has been calculated for every one of the above information presentation positions.

Note that regarding the approach of calculating the browsing rate used in the above second and third approaches, an example will be described later.

Operation Example

Next, an information presentation operation performed by the information processing apparatus 3 configured as described above will be described.

The information processing apparatus 3 according to the present embodiment includes the first, second, and third approaches as the approach of determining the presentation position of the information, as previously described. Thus, the information presentation operation will be described separately for each of the above determination approaches.

(1) Information Presentation Operation Using First Approach

Figure 6:
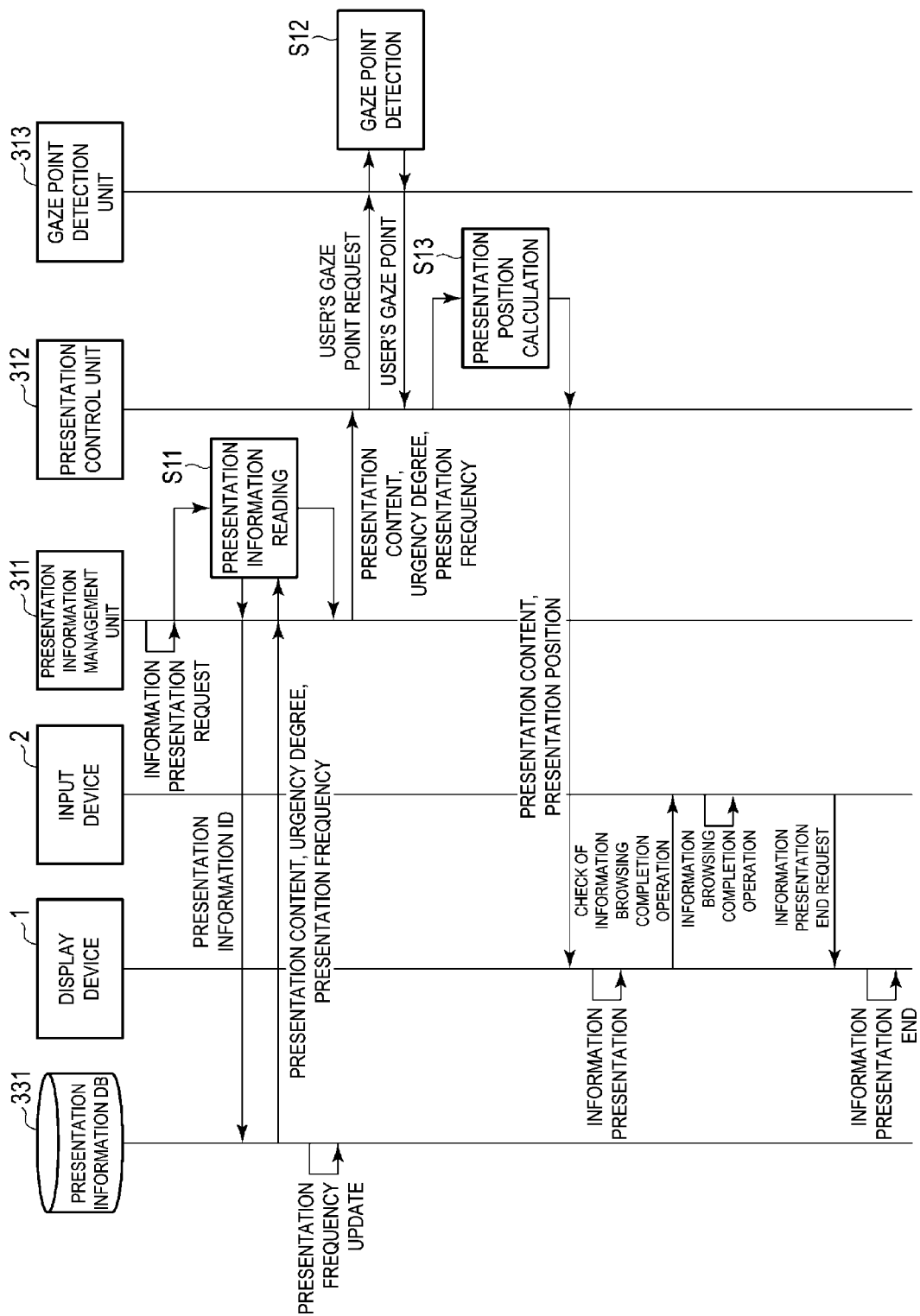
FIG. 6 is a sequence diagram illustrating a first operation example of an information presentation processing performed by the information processing apparatus illustrated in FIGS. 2 and 3.

FIG. 6 is a sequence diagram illustrating an example of a processing procedure of an information presentation operation using the first approach.

(1-1) Management of Presentation Information

For example, it is assumed that a user has visited a medical institution for a medical checkup or a healthcare center for a health consultation, and has received health advice from a doctor or a healthcare adviser. In this case, advice information regarding health management is transmitted to the information processing apparatus 3 of the user from the server apparatus 5 of the medical institution or the healthcare center.

When the advice information that has been transmitted from the server apparatus 5 is received by the communication I/F 35, the information processing apparatus 3 stores the received advice information, as presentation information, in the presentation information DB 331 in the data storage unit 33 under the control of the presentation information management unit 311.

FIG. 4 illustrates an example of the presentation information. In this example, text data such as "Take stairs" and "Take medicine for hypertension" is stored as contents to be presented together with data indicating its urgency degree and presentation frequency. A value indicating the urgency degree increases, as the urgency degree is higher. In addition, a value indicating the presentation frequency is represented by the number of presentation times per day (the number of times/day), and is updated whenever the information is presented.

Note that a transmission request for the above presentation information may be transmitted from the information processing apparatus 3 to the server apparatus 5 so that the presentation information addressed to the information processing apparatus 3 can be obtained, or the above presentation information may be input by the user itself on the input device 2.

In a state in which the above presentation information is stored, the information processing apparatus 3 monitors, by the presentation information management unit 311, an issuance of the presentation request for every piece of the presentation information stored in the presentation information DB 331. For example, the information processing apparatus 3 monitors the presentation timing of every piece of the presentation information. The presentation timing is monitored for every piece of the presentation information, by using a presentation time or a presentation cycle included in attribute information (omitted in the figure) attached with the presentation information.

For example, it is assumed that the presentation timing of a certain piece of the presentation information has come now. Then, as illustrated in FIG. 6, the presentation information management unit 311 first accesses the presentation information DB 331 in step S11 based on the presentation information ID, and reads a content of the corresponding presentation information and the values indicating the urgency degree and the presentation frequency. At this time, in the presentation information DB 331, the value indicating the presentation frequency of the presentation information that has been read is updated. The presentation information management unit 311 sends, to the presentation control unit 312, the values indicating the read urgency degree and presentation frequency as data for determining the presentation position.

(1-2) Determination of Presentation Position Using First Approach

The first approach is for determining the presentation position based on the values indicating the urgency degree and the presentation frequency of the presentation information that have been sent from the presentation information management unit 311, as previously described.

In other words, in the information processing apparatus 3, a user gaze point request is first sent from the presentation control unit 312 to the gaze point detection unit 313. In step S12, the gaze point detection unit 313 acquires image data representing the current state of the user's eyeballs that has been captured by the camera 6 via the input and output I/F 34, and detects the user's visual line direction based on the acquired image data of the eyeballs. Then, the gaze point detection unit 313 detects the gaze point P within the visual field range of the user based on the detected user's visual line direction, and returns a detection result to the presentation control unit 312. Example of an approach of detecting the visual line direction include a known approach of detecting respective coordinate positions of a bright point and a pupil from the image data, and calculating the visual line direction based on a vector difference between the coordinate positions. However, the approach is not limited to this.

Figure 7:
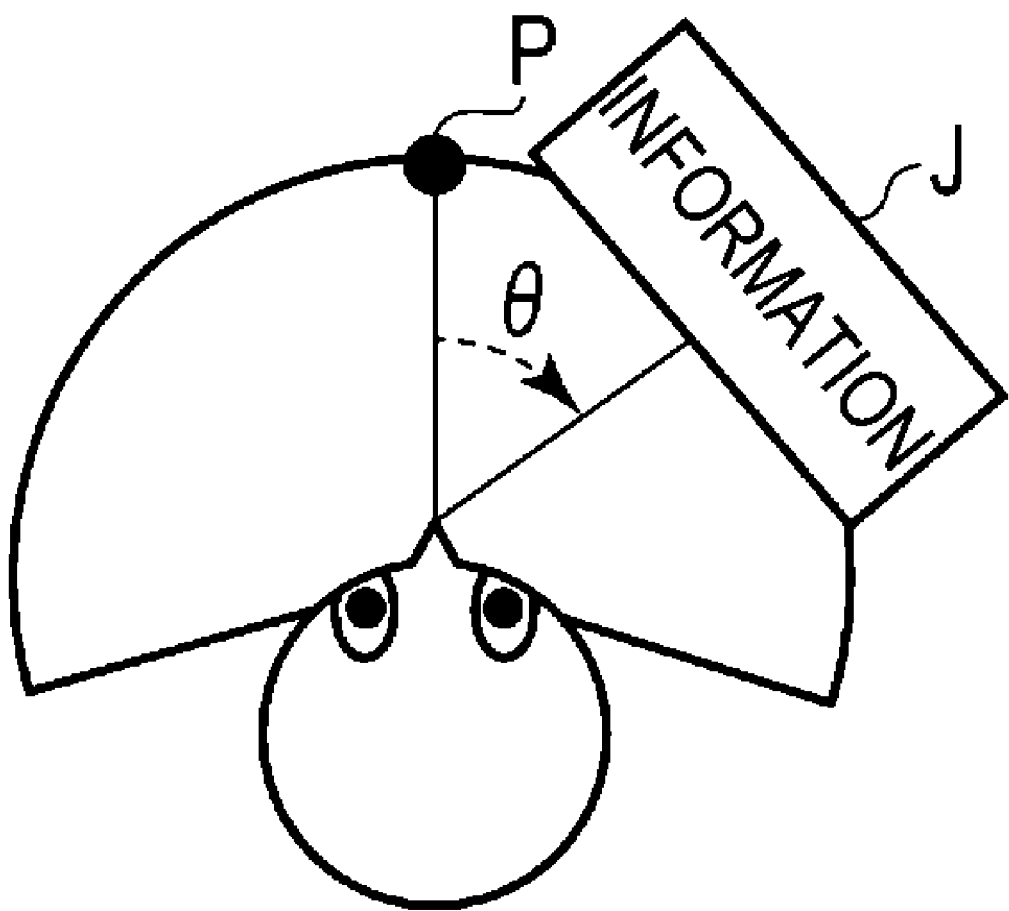
FIG. 7 is a diagram for describing an example of an angle θ from a user's gaze point to an information presentation position.

Next, under the control of the presentation control unit 312, in step S13, the information processing apparatus 3 calculates the presentation position with reference to the user's gaze point P as the angle θ from the gaze point P, for example, as illustrated in FIG. 7, in accordance with the values indicating the urgency degree and the presentation frequency of the presentation information that have been sent from the above presentation information management unit 311.

For example, when the urgency degree is defined as α, the presentation frequency is defined as β, and respective weighting coefficients given to them are defined as $w_1$ and $w_2$, the angle θ is represented by the following equation:

$$\theta = w_1 f_1(\alpha) + w_2 f_2(\beta). \quad (1)$$

Here, $f_1(\alpha)$ is a function inversely proportional to $\alpha$, $f_2(\beta)$ is a function proportional to $\beta$, and the weighting coefficients $w_1$ and $w_2$ are optionally set in accordance with the importance with respect to the urgency degree and the presentation frequency.

Note that in the calculation of the above angle θ, the above urgency degree $\alpha$ and presentation frequency $\beta$ both may not be necessarily used, and the angle θ indicating the presentation position may be calculated by using only one of the above urgency degree $\alpha$ or the presentation frequency $\beta$.

(1-3) Display of Presentation Information

The presentation control unit 312 determines a display position J of the presentation information within the display area of the display device 1 in accordance with the above calculated angle θ. Then, the presentation control unit 312 outputs text data representing the content of the presentation information that has been read from the above presentation information DB 331 together with information designating the above display position J, via the input and output I/F 34, to the display device 1, and causes the text data to be displayed at the above determined display position J within the display area of the display device 1.

Figure 8A:
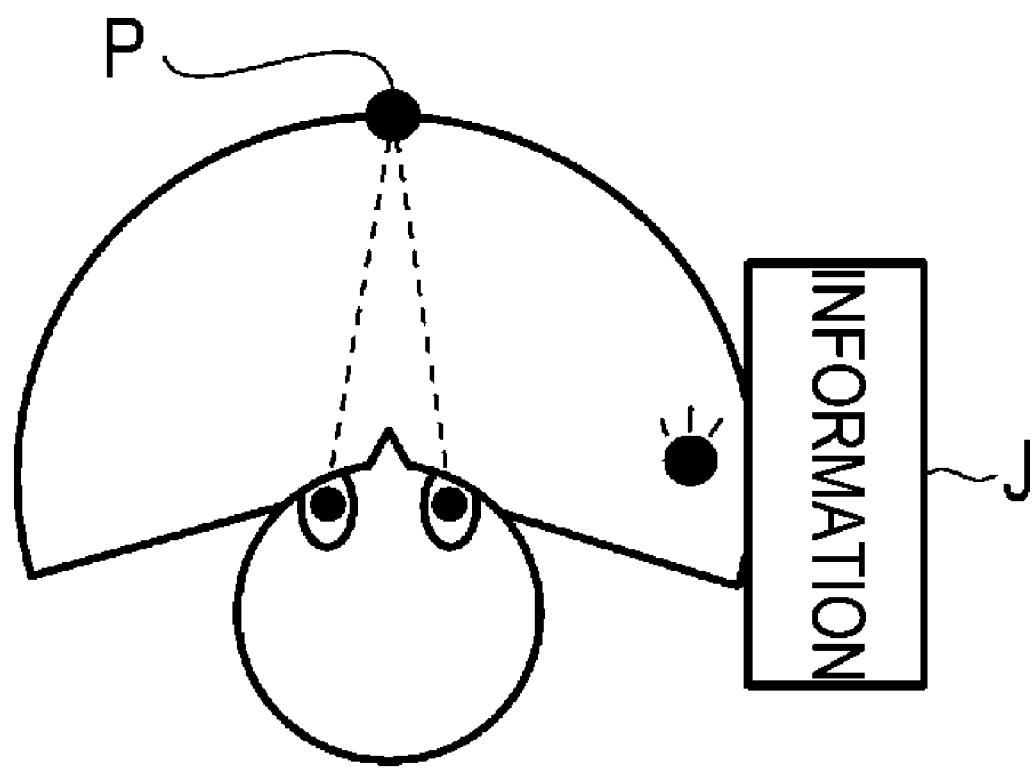
FIG. 8A is a diagram for describing a first example of a presentation position of information in a visual field range of the user, and illustrating a state in which the information is presented in an outermost area of a peripheral visual field.
Figure 8B:
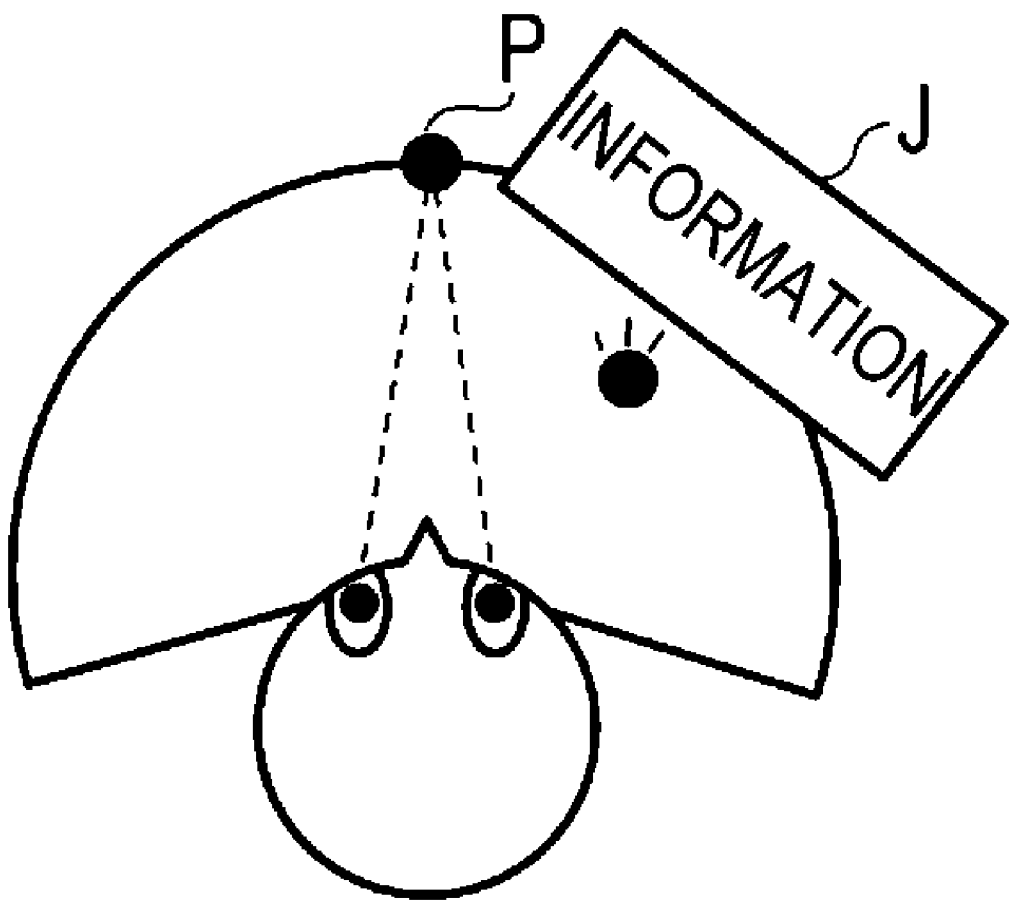
FIG. 8B is a diagram for describing a second example of the presentation position of the information in the visual field range of the user, and illustrating a state in which the information is presented in the vicinity of an intermediate area of the peripheral visual field.
Figure 8C:
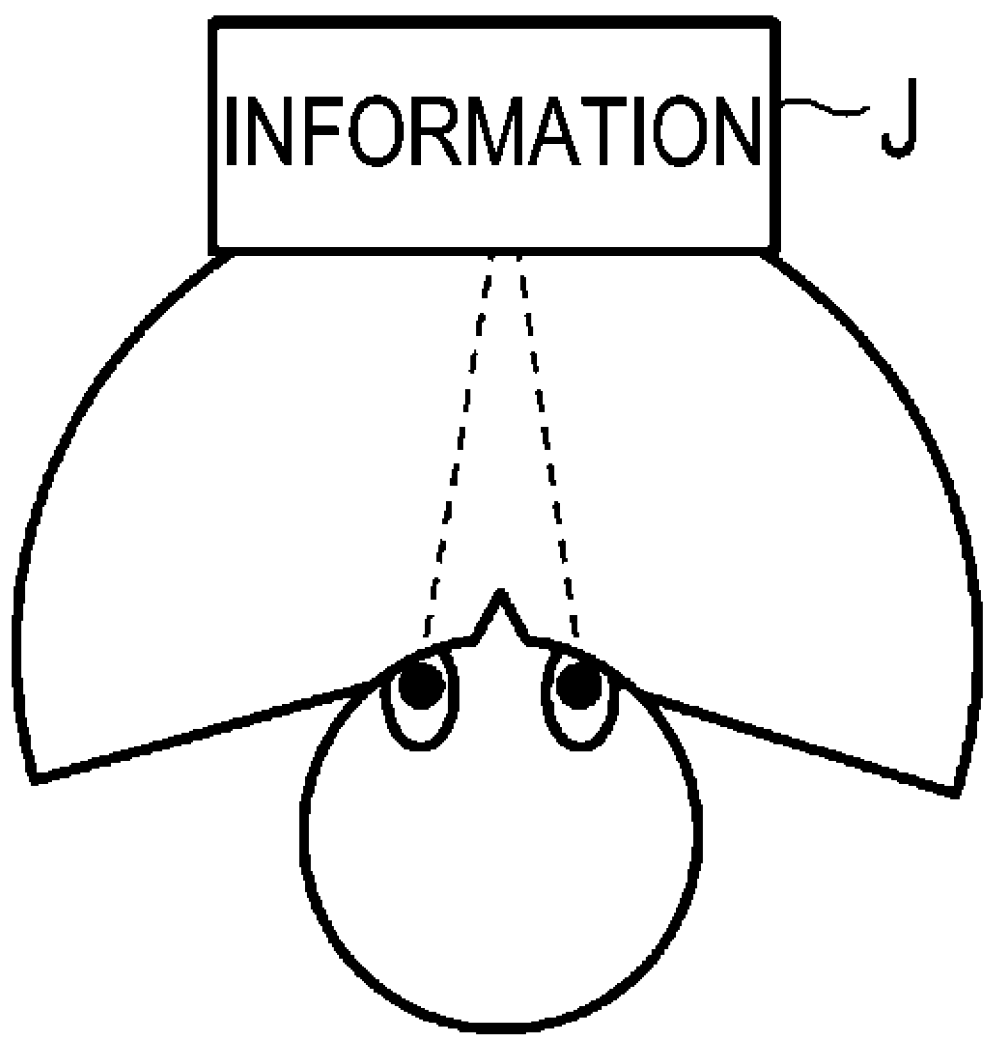
FIG. 8C is a diagram for describing a third example of the presentation position of the information in the visual field range of the user, and illustrating a state in which the information is presented in a gaze point area of the peripheral visual field.

FIGS. 8A, 8B, and 8C illustrate examples of the information presentation position that has been determined by the above first approach. FIG. 8A illustrates the presentation position of information J in a case where, for example, the presentation frequency $\beta$ is high and the urgency degree $\alpha$ is low. FIG. 8B illustrates the presentation position of the information J in a case where, for example, the presentation frequency $\beta$ and the urgency degree $\alpha$ are both at medium levels. FIG. 8C illustrates the presentation position of the information J in a case where, for example, the presentation frequency $\beta$ is low and the urgency degree $\alpha$ is high.

Finally, the information processing apparatus 3 monitors a completion operation of information browsing by the user during the display period of the above information. In this state, when the user performs the completion operation of the information browsing on the input device 2, the display device 1 ends the display of the above information.

(2) Information Presentation Operation Using Second Approach

Figure 9:
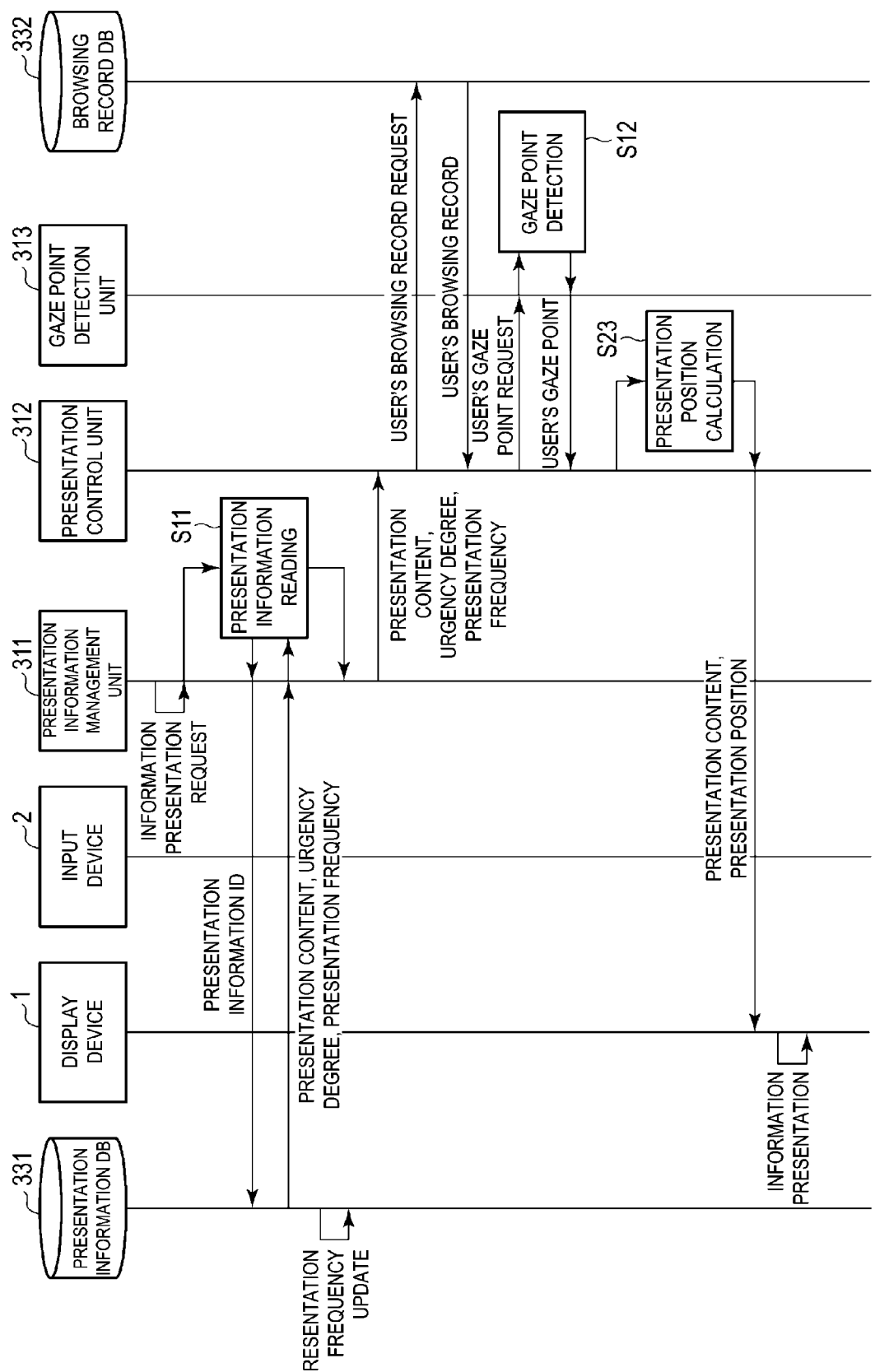
FIG. 9 is a sequence diagram illustrating a former part of a second operation example of the information presentation processing performed by the information processing apparatus illustrated in FIGS. 2 and 3.
Figure 10:
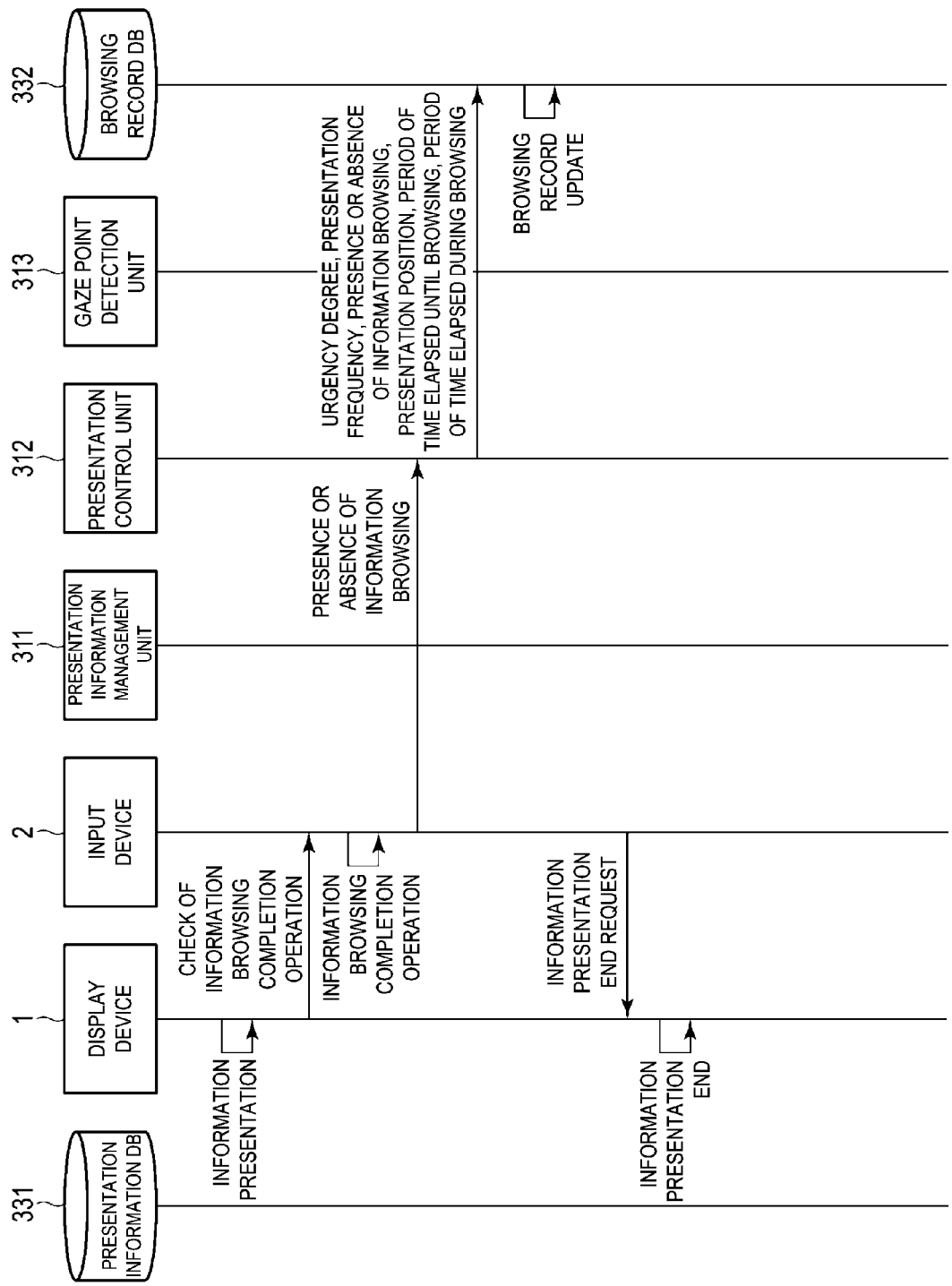
FIG. 10 is a sequence diagram illustrating a latter part of the second operation example of the information presentation processing performed by the information processing apparatus illustrated in FIGS. 2 and 3.

FIGS. 9 and 10 are sequence diagrams each illustrating an example of a processing procedure for an information presentation operation using the second approach. Note that the management processing of the presentation information is the same as the processing that has been described in (1-1), and thus descriptions thereof are omitted by applying the same reference signs.

(2-1) Determination of Presentation Position Using Second Approach

The second approach is for determining the presentation position based on the user's browsing rate ρ at the time when the information has been presented in the past, the information matching in at least one of the urgency degree $\alpha$ of the information to be presented from now, the presentation frequency $\beta$ of the information to be presented from now, or the presentation position $\sigma_k$ at the time when the information presentation has been conducted in the past.

Upon reception of the data indicating the content, the urgency degree, and the presentation frequency of the presentation information from the presentation information management unit 311, the presentation control unit 312 first sends a browsing record acquisition request to the browsing record DB 332, and acquires browsing history information from the browsing record DB 332. In addition to that, the presentation control unit 312 sends an acquisition request of the user's gaze point to the gaze point detection unit 313. In step S12, the gaze point detection unit 313 acquires image data representing the current state of the user's eyeballs that has been captured by the camera 6 via the input and output I/F 34, and detects the user's visual line direction based on the acquired image data of the eyeballs. Then, the gaze point detection unit 313 detects the gaze point P within the visual field range of the user based on the detected user's visual line direction, and returns a detection result to the presentation control unit 312.

Next, the presentation control unit 312 calculates the presentation position in step S23 as follows.

First, the presentation control unit 312 calculates a past browsing rate ρ of the user at every presentation position based on the above acquired browsing history information. The browsing rate ρ is calculated for every browsing record by determining whether the information has been browsed by the user. For example, the presence or absence of browsing by the user is determined from information of the user's browsing record, and the period of time elapsed until browsing is compared with a threshold value. In a case where the period exceeds the threshold value, it is determined that the user has not browsed. Further, a period of time elapsed during browsing is compared with a threshold value. In a case where the period exceeds the threshold value, it is determined that the user has browsed. Then, the presentation control unit 312 calculates a browsing rate ρ ($\alpha$, $\beta$, $\sigma_k$) of the presentation information for every information presentation position based on at least one of the above determination results.

The processing described heretofore is expressed by the following equation.

[Math. 1]

$$I = h(\alpha, \beta, \sigma_k) \ (0 < k \leq m) \tag{2}$$

$$n_j(\alpha, \beta, \sigma_k) = \begin{cases} 0 & (x_i = -1 \text{ or } y_i > t_y \text{ or } z_i < t_z) \\ 1 & (x_i = 1 \text{ and } y_i \leq t_y \text{ and } z_i \geq t_z) \end{cases}$$
$$(i \in I, \ 0 < i \leq m), \ (0 < j \leq d)$$

$$\rho(\alpha, \beta, \sigma_k) = \frac{\sum_{j=1}^{d} n_j(\alpha, \beta, \sigma_k)}{d}$$

Here, i and k each denote an index indicating a browsing record ID, m denotes the number of pieces of data stored in the browsing record DB 332, $x_i$, $y_i$, and $z_i$ respectively denote a browsing record, a period of time elapsed until browsing, and a period of time elapsed during browsing. In addition, $n_j$ denotes a value indicating a determination result of the presence or absence of the information browsing, d denotes the number of times that information having given $\alpha$, $\beta$, and $\sigma_k$ has been presented in the past, $t_y$ denotes a threshold value for determining the absence of browse from the value of $y_i$, $t_z$ denotes a threshold value for determining the presence of browsing from the value of $z_i$, and $h(\alpha, \beta, \sigma_k)$ denotes a function representing a set of the browsing record IDs at the time when the information presentation having the urgency degree, the presentation frequency, and the presentation position information that are the same as the urgency degree $\alpha$, the presentation frequency $\beta$, a past presentation position $\sigma_k$ has been conducted.

Next, the presentation control unit 312, in consideration of the above calculated browsing rate $\rho(\alpha, \beta, \sigma_k)$, calculates the presentation position (the angle θ with reference to the gaze point P, which is a detection result of the above gaze point detection unit 313). The equation for the calculation is as follows:

$$\theta = w_1 f_1(\alpha) + w_2 f_2(\beta) + w_3 f_3(\rho(\alpha, \beta, \sigma_k)). \quad (3)$$

Here, $w_1$, $w_2$, and $w_3$ each indicate a weighting coefficient.

By calculating the presentation position (the angle $\theta$ with reference to the gaze point P) using the above equation (3), in addition to the urgency degree $\alpha$ and the presentation frequency $\beta$ of the information to be presented, the presentation position of the information can be determined by further considering the browsing rate $\rho(\alpha, \beta, \sigma_k)$ that has been calculated from a past browsing history.

Note that the function $f_3(\rho(\alpha, \beta, \sigma_k))$ in the above equation (3) may be a function set so that the value changes in proportion to the browsing rate $\rho$ in order to bring the presentation position closer to the gaze point P, as the browsing rate $\rho$ is smaller.

In addition, regarding the function $f_3(\rho(\alpha, \beta, \sigma_k))$, for example, from among all presentation positions $\sigma_k$ at the time when the information having the urgency degree and the presentation frequency that respectively match the urgency degree $\alpha$ and the presentation frequency $\beta$ of given information has been presented in the past, the presentation position having the largest browsing rate $\rho(\alpha, \beta, \sigma_k)$ is calculated by the following equation:

$$f_3(\rho(\alpha, \beta, \sigma_k)) = \mathrm{argmax}_{\sigma k}(\rho(\alpha, \beta, \sigma_k)). \quad (4)$$

Furthermore, regarding the above function $f_3(\rho(\alpha, \beta, \sigma_k))$, without selecting the presentation position having the largest browsing rate $\rho(\alpha, \beta, \sigma_k)$, it may be possible to select a desired presentation position from among those where the browsing rate satisfies a predetermined condition (for example, the browsing rate equal to or larger than a preset threshold value).

Note that the angle $\theta$ of the visual line with respect to the gaze point P indicating the above presentation position may be calculated using only the browsing rate $\rho(\alpha, \beta, \sigma_k)$. The following is a calculation equation in such a case.

$$\theta = f_3(\rho(\alpha, \beta, \sigma_k)). \quad (5)$$

(2-2) Display of Information and Update of Browsing Record

The presentation control unit 312 determines the display position J of the information within the display area of the display device 1 in accordance with the above calculated angle $\theta$. Then, the presentation control unit 312 outputs text data representing the content of the presentation information that has been read from the presentation information DB 331, together with information designating the above display position J, via the input and output I/F 34, to the display device 1, and causes the text data to be displayed at the above determined display position J within the display area of the display device 1.

In addition, as illustrated in FIG. 10, the presentation control unit 312 monitors a completion operation of the information browsing by the user during the display period of the above information. In this state, when the user performs the completion operation of the information browsing on the input device 2, the presentation control unit 312 generates information representing a result of the information browsing. For example, the presentation control unit 312 generates the information including the presence or absence of browsing and the presentation position, as well as the period of time elapsed until browsing and the period of time elapsed during browsing in a case of the presence of browsing. Then, the presentation control unit 312 sends the generated information representing a result of the information browsing and the respective values indicating the urgency degree $\alpha$ and the presentation frequency $\beta$ of the above presentation information, together with the presentation information ID, to the browsing record DB 332. Accordingly, the browsing history information in the browsing record DB 332 is updated.

Finally, in response to the above completion operation of the information browsing by the user, the information processing apparatus 3 ends the display of the above information on the display device 1.

Actions and Effects

As described above in detail, in one embodiment, the presentation control unit 312 is configured to calculate the angle $\theta$ in the visual line direction with reference to the user's gaze point P, using the first approach for determining the presentation position, in accordance with the urgency degree $\alpha$ and the presentation frequency $\beta$ of the presentation information to be presented from now, and to display the content of the presentation information at a position corresponding to the above calculated angle $\theta$ within the display area of the display device 1. Therefore, when the content of the presentation information is displayed to interrupt the display area of the display device 1, the content is displayed at a position obtained in consideration of the urgency degree $\alpha$ and the presentation frequency $\beta$ of the presentation information. This configuration enables, for example, the user to certainly browse the presentation information having a low presentation frequency and a high urgency degree, and on the other hand, enables a reduction in an influence on the user's activities, because the presentation information having a relatively low urgency degree and a high presentation frequency is displayed in the peripheral visual field of the user.

In addition, in one embodiment, according to the second approach for determining the presentation position, in a case where at least one of the urgency degree $\alpha$ of the presentation information to be presented from now, the presentation frequency $\beta$ of the presentation information to be presented from now, or the presentation position $\sigma_k$ at the time when the information presentation has been conducted in the past is given, the presentation control unit 312 calculates the user's browsing rate $\rho$ at the time when the information matching in at least one of the given urgency degree $\alpha$, presentation frequency $\beta$, or presentation position $\sigma_k$ has been presented in the past. Then, in consideration of the calculated browsing rate $\rho$ as information indicating the user's tendency at the time of information browsing, the display position of the above presentation information within the display area of the display device 1 is determined, and then the presentation information is displayed. Therefore, the angle $\theta$ indicating the presentation position of the information to be presented from now is determined in consideration of the user's browsing rate $\rho$ at the past presentation position. This configuration enables effective information presentation in consideration of the user's tendency to the information presentation based on the user's past browsing history at the information presentation position.

Further, the presentation position is determined in accordance with at least one of the urgency degree $\alpha$ of the information to be presented, the presentation frequency $\beta$ of the information to be presented, or the user's browsing rate $\rho$ at every one of the past information presentation positions. This configuration enables determination of the presentation position, even though data regarding any of the above urgency degree α, presentation frequency β, or past information presentation position $\sigma_k$ cannot be acquired.

Modified Examples

Note that the present invention is not limited to the above embodiments, and can be variously modified on an implementation stage without departing from the gist of the present invention. For example, the type and configuration of the information presentation apparatus, the type and configuration of the display device, the procedure and content of the processing for determining the information presentation position, the type of the presentation information, and the method for generating the presentation information can be variously modified without departing from the gist of the present invention.

In addition, the embodiments may be appropriately selected or combined together to the extent possible. Furthermore, the above embodiments include inventions on various stages, and various inventions can be extracted from appropriate combinations of a plurality of disclosed constituent elements.

REFERENCE SIGNS LIST

1 Display device
2 Input device
3 Information processing apparatus
4 Network
5 Server apparatus
6 Camera
31 Control unit
32 Program storage unit
33 Data storage unit
34 Input and output I/F
35 Communication I/F
36 Bus
311 Presentation information management unit
312 Presentation control unit
313 Gaze point detection unit
331 Presentation information DB
332 Browsing record DB

The invention claimed is:

1. An information presentation apparatus configured to display information on a display device including a display area corresponding to a visual field range of a user, the information presentation apparatus comprising:
a first storage medium configured to store presentation information including content information representing a presentation content and attribute information of the content information;
a processor; and
a storage medium having computer program instructions stored thereon, when executed by the processor, perform to:
detect a gaze point within the visual field range of the user;
determine a presentation position of the content information within the visual field range of the user in accordance with the attribute information stored together with the content information to be presented and the detected gaze point;
cause the content information to be displayed at a position corresponding to the determined presentation position within the display area of the display device; and
calculate information related to respective browsing rates of the user at a plurality of past presentation positions within the visual field range of the user in accordance with the stored information representing the browsing history,
wherein determining the presentation position includes selecting a presentation position that satisfies a preset condition from among the plurality of presentation positions within the visual field range of the user in accordance with the information related to the browsing rates, and
wherein causing the content information to be displayed includes causing the content information to be displayed at a position corresponding to the selected presentation position within the display area of the display device.

2. The information presentation apparatus according to claim 1, wherein
the attribute information includes at least one of an urgency degree or a presentation frequency of the content information, and
wherein the computer program instructions further perform to determine the presentation position such that the presentation position is closer to the gaze point, as the urgency degree increases, and determine the presentation position such that the presentation position is closer to the gaze point, as the presentation frequency decreases.

3. A non-transitory computer-readable medium having computer-executable instructions that, upon execution of the instructions by a processor of a computer, cause the computer to function as the information presentation apparatus according to claim 1.

4. An information presentation apparatus configured to display information on a display device including a display area corresponding to a visual field range of a user, the information presentation apparatus comprising:
a first storage medium configured to store presentation information including content information representing a presentation content;
a second storage medium configured to store information representing a browsing history of the user regarding presentation of the content information;
a processor; and
a storage medium having computer program instructions stored thereon, when executed by the processor, perform to:
detect a gaze point within the visual field range of the user; and
calculate information related to respective browsing rates of the user at a plurality of past presentation positions within the visual field range of the user in accordance with the stored information representing the browsing history, determine a presentation position of the content information within the visual field range of the user in accordance with the information related to the browsing rates and the detected gaze point, and cause the content information to be displayed at a position corresponding to the determined presentation position within the display area of the display device,
wherein determining the presentation position includes selecting a presentation position that satisfies a preset condition from among the plurality of presentation positions within the visual field range of the user in accordance with the information related to the browsing rates, and wherein causing the content information to be displayed includes causing the content information to be displayed at a position corresponding to the selected presentation position within the display area of the display device.

5. The information presentation apparatus according to claim 4, wherein
the presentation information further includes attribute information including at least one of an urgency degree or a presentation frequency of the content information, and
wherein the computer program instructions further perform to
in a case where at least one of the urgency degree or the presentation frequency of the content information to be presented from now and the past presentation position of the content information are given, calculate, from the information representing the browsing history, the information related to the browsing rate of the user at a time when the information presentation matching in at least one of the given urgency degree, the given presentation frequency, or the given presentation position has been conducted in a past,
determine the presentation position of the content information within the visual field range of the user in accordance with the information related to the browsing rate and the detected gaze point, and
cause the content information to be displayed at a position corresponding to the determined presentation position within the display area of the display device.

6. An information presentation method performed by an information processing apparatus connected to a display device including a display area corresponding to a visual field range of a user, the information presentation method comprising:
detecting a gaze point within the visual field range of the user;
determining, in accordance with information representing an attribute of content information representing a presentation content and the detected gaze point, a presentation position of the content information within the visual field range of the user;
causing the content information to be displayed at a position corresponding to the determined presentation position within the display area of the display device; and
calculating information related to respective browsing rates of the user at a plurality of past presentation positions within the visual field range of the user in accordance with the stored information representing the browsing history,
wherein determining the presentation position includes selecting a presentation position that satisfies a preset condition from among the plurality of presentation positions within the visual field range of the user in accordance with the information related to the browsing rates, and
wherein causing the content information to be displayed includes causing the content information to be displayed at a position corresponding to the selected presentation position within the display area of the display device.

* * * * *